United States Patent
Zhu et al.

(10) Patent No.: US 11,928,490 B2
(45) Date of Patent: Mar. 12, 2024

(54) VIRTUAL MACHINE MIGRATION METHOD AND DATA CENTER

(71) Applicant: Huawei Cloud Computing Technologies Co., Ltd., Guizhou (CN)

(72) Inventors: Na Zhu, Hangzhou (CN); Fei Rao, Hangzhou (CN)

(73) Assignee: HUAWEI CLOUD COMPUTING TECHNOLOGIES CO., LTD., Guizhou (CN)

( * ) Notice: Subject to any disclaimer, the term of this patent is extended or adjusted under 35 U.S.C. 154(b) by 659 days.

(21) Appl. No.: 16/950,291

(22) Filed: Nov. 17, 2020

(65) Prior Publication Data

US 2021/0073020 A1     Mar. 11, 2021

Related U.S. Application Data

(63) Continuation of application No. PCT/CN2019/087371, filed on May 17, 2019.

(30) Foreign Application Priority Data

May 18, 2018     (CN) .......................... 201810482359.5

(51) Int. Cl.
G06F 9/455     (2018.01)
H04L 12/46     (2006.01)
H04L 49/00     (2022.01)

(52) U.S. Cl.
CPC ...... *G06F 9/45558* (2013.01); *H04L 12/4641* (2013.01); *H04L 49/70* (2013.01);
(Continued)

(58) Field of Classification Search
CPC ....... G06F 9/45558; G06F 2009/45562; G06F 2009/4557; G06F 2009/45595;
(Continued)

(56) References Cited

U.S. PATENT DOCUMENTS

2008/0189432 A1   8/2008   Abali et al.
2014/0133358 A1*  5/2014   Yin ..................... H04L 41/0894
                                                                 370/254
(Continued)

FOREIGN PATENT DOCUMENTS

CN     102412978 A     4/2012
CN     103026660 A     4/2013
(Continued)

OTHER PUBLICATIONS

3GPP TR 32.842 V2.0.0, "3rd Generation Partnership Project; Technical Specification Group Services and System Aspects; Telecommunication management; Study on network management of virtualized networks (Release 13)," Sep. 2015, 84 pages.
(Continued)

*Primary Examiner* — Sisley N Kim
(74) *Attorney, Agent, or Firm* — Conley Rose, P.C.

(57) ABSTRACT

After obtaining a virtual machine migration message, a control node performs first network configuration on a virtual switch of a new virtual machine. After performing the first network configuration, the control node creates the new virtual machine, and performs second network configuration on a second virtual switch in a virtual network in which a to-be-migrated virtual machine is located. In the present application, before the new virtual machine is created, a network connection of the to-be-migrated virtual machine is maintained, and a part of network configuration for the new virtual machine is completed.

20 Claims, 12 Drawing Sheets

(52) U.S. Cl.
CPC .............. *G06F 2009/45562* (2013.01); *G06F 2009/4557* (2013.01); *G06F 2009/45595* (2013.01)

(58) Field of Classification Search
CPC . G06F 9/5077; G06F 9/4856; H04L 12/4641; H04L 41/0803; H04L 45/66; H04L 45/74; H04L 49/70; H04L 41/0895; H04L 45/02; H04L 45/64
See application file for complete search history.

(56) References Cited

U.S. PATENT DOCUMENTS

| | | | |
|---|---|---|---|
| 2014/0250220 A1 | 9/2014 | Kapadia et al. | |
| 2014/0321459 A1* | 10/2014 | Kumar | H04L 47/2425 370/360 |
| 2015/0281067 A1 | 10/2015 | Wu | |
| 2016/0239319 A1 | 8/2016 | Zhang et al. | |
| 2019/0036868 A1* | 1/2019 | Chandrashekhar | H04L 45/021 |
| 2019/0245782 A1* | 8/2019 | Jin | H04L 49/252 |
| 2021/0073020 A1 | 3/2021 | Zhu et al. | |

FOREIGN PATENT DOCUMENTS

| | | |
|---|---|---|
| CN | 103812823 A | 5/2014 |
| CN | 104115453 A | 10/2014 |
| CN | 105103128 A | 11/2015 |
| CN | 108768895 A | 11/2018 |
| EP | 2648098 A2 | 10/2013 |
| WO | 2014071637 A1 | 5/2014 |

OTHER PUBLICATIONS

Liu, L., et al., "Comprehensive stable VM migration techniques for managing time-varied workload," Application Research of Computers, vol. 33, No. 2, Feb. 2016, 7 pages.

Khosravi, A., et al., "Online virtual machine migration for renewable energy usage maximization in geographically distributed cloud data centers," WILEY, Jan. 3, 2017, 13 pages.

Zeng, L., "Layer 3 Cross-site VM Live Migration Scheme," draft-zeng-nvo3-13-vm-migration-00.txt, XP015099547, Jun. 12, 2014, 12 pages.

Liu, J., et al., "Software defined live virtual machine migration," XP032563731, Oct. 7, 2013, 3 pages.

* cited by examiner

VIRTUAL MACHINE MIGRATION METHOD AND DATA CENTER

CROSS-REFERENCE TO RELATED APPLICATIONS

This is a continuation of Int'l Patent App. No. PCT/CN2019/087371 filed on May 17, 2019, which claims priority to Chinese Patent App. No. 201810482359.5 filed on May 18, 2018, which are incorporated by reference.

FIELD

This disclosure relates to the field of information processing technologies, and in particular, to a virtual machine migration method and a data center.

BACKGROUND

A data center needs to provide a virtual machine migration service based on a service requirement. In other words, a virtual machine needs to be migrated from a first storage location of the data center to a second storage location of the platform. Virtual machine migration includes migration of a disk, a memory, and a device status of a virtual machine, and migration of a network. The device status includes but is not limited to a central processing unit (CPU) status, an input/output (I/O) device status, or the like. The migration of the disk, the memory, and the device status ensures that a status of the new virtual machine is the same as that of the to-be-migrated virtual machine. The migration of the network ensures that a network connection of the new virtual machine is not affected.

Virtual machine live migration may also be referred to as virtual machine online migration, and is a process of migrating a virtual machine while keeping the virtual machine running and providing a service externally. The virtual machine live migration allows only short downtime in a live migration process. This does not affect normal running of a service on the virtual machine, and a user is not really aware of service interruption of the virtual machine. For the virtual machine live migration, reducing service interruption caused by network migration is important to reduction of downtime of the virtual machine live migration.

SUMMARY

A migration process of a to-be-migrated virtual machine stored in a first storage location includes creating a new virtual machine at a second storage location. The new virtual machine and the to-be-migrated virtual machine complete a same service, and provide a same function for a user. The new virtual machine at the second storage location of the data center performs all services provided by the to-be-migrated virtual machine.

According to a first aspect, a virtual machine migration method includes the following steps: A control node obtains a virtual machine migration message, where the virtual machine migration message includes location information of a first virtual switch, and the first virtual switch is configured to connect to a new virtual machine; the control node performs first network configuration on the first virtual switch based on the location information of the first virtual switch after obtaining the virtual machine migration message; and the control node creates the new virtual machine after performing the first network configuration. The control node further performs second network configuration on a second virtual switch, where the second virtual switch is connected to another virtual machine, and the another virtual machine has a communication connection to a to-be-migrated virtual machine.

In the method, before the new virtual machine is created, a part of network configuration in a virtual machine migration process is completed, that is, the first network configuration for the first virtual switch does not affect a network connection of the to-be-migrated virtual machine, so that the first network configuration may be skipped in a network configuration process after the new virtual machine is created, and only the second network configuration is performed. The network configuration process after the new virtual machine is created may cause interruption of a virtual machine network connection. However, in the method, the network configuration process after the new virtual machine is created is reduced, thereby shortening a network interruption time in the virtual machine migration process, and reducing impact of the virtual machine migration process on a service.

With reference to the first aspect, in a first implementation of the first aspect, the method further includes the following steps: The first virtual switch forwards, to the new virtual machine based on the first network configuration, a packet sent by the another virtual machine, and forwards, to the another virtual machine, a packet sent by the new virtual machine; and the second virtual switch, forwards, to the another virtual machine based on the second network configuration, a packet sent by the new virtual machine, and forwards, to the new virtual machine, a packet sent by the another virtual machine.

The first virtual switch and the second virtual switch establish a layer-2 network connection between the new virtual machine and the another virtual machine by using packet forwarding.

With reference to the first aspect or the first implementation of the first aspect, in a second implementation of the first aspect, the method further includes the following step: The control node performs third network configuration on a router, where the router is deployed in a virtual network in which the to-be-migrated virtual machine is located; and the router forwards, to the new virtual machine based on the third network configuration, a packet sent by a cross-subnet virtual machine, and forwards, to the cross-subnet virtual machine, the packet sent by the new virtual machine, where the cross-subnet virtual machine and the to-be-migrated virtual machine are located in different subnets.

The router establishes, by using the third network configuration, a layer 3 network connection between the new virtual machine and the cross-subnet virtual machine, thereby implementing network communication between the new virtual machine and the cross-subnet virtual machine.

With reference to the first aspect, or the first or the second implementation of the first aspect, in a third implementation of the first aspect, the new virtual machine and the to-be-migrated virtual machine have a same internet protocol IP address, and the method further includes the following step: The control node performs fourth network configuration on the second virtual switch, so that the another virtual machine does not forward the sent packet to the to-be-migrated virtual machine.

If live migration is used in a to-be-migrated virtual machine migration process, the new virtual machine and the to-be-migrated virtual machine have the same internet protocol IP address. The fourth network configuration can prevent the second virtual switch from forwarding the packet sent by the another virtual machine to the to-bemigrated virtual machine after a network connection between the new virtual machine and the another virtual machine is created, and at the same time, reclaim storage space occupied by a deletable forwarding table in the second virtual switch. The deletable forwarding table is that the second virtual switch forwards another sent packet to a forwarding table of the to-be-migrated virtual machine.

According to a second aspect, a virtual machine migration method includes the following steps: A control node obtains a virtual machine migration message, where the virtual machine migration message includes location information of a first virtual switch, and the first virtual switch is connected to a new virtual machine; the control node performs fifth network configuration on the first virtual switch based on the location information of the first virtual switch after the virtual machine migration message is obtained, and performs sixth network configuration on a router, where the router is deployed in a virtual network in which a to-be-migrated virtual machine is located; and the control node creates the new virtual machine after performing the fifth network configuration and the sixth network configuration. The router forwards, to a cross-subnet virtual machine based on the sixth network configuration, a packet sent by the new virtual machine, where the cross-subnet virtual machine and the to-be-migrated virtual machine are located in different subnets. The control node performs seventh network configuration on a second virtual switch, where the second virtual switch is connected to another virtual machine; and the control node performs eighth network configuration on the router, so that the router forwards, to the new virtual machine, a packet sent by the cross-subnet virtual machine.

Same as the method in the first aspect, in the method, a network configuration process after the new virtual machine is created is reduced, thereby shortening a network interruption time in a virtual machine migration process, and reducing impact of the virtual machine migration process on a service. In the method, without affecting communication of the to-be-migrated virtual machine, the fifth network configuration for the first virtual switch and a part of network configuration for the router, namely, the sixth network configuration, is completed, so that the network configuration process after the new virtual machine is created is further reduced, thereby further shortening the network interruption time in the virtual machine migration process, and reducing the impact of the virtual machine migration process on the service.

With reference to the second aspect, in a first implementation of the second aspect, the method further includes the following steps: The first virtual switch sends, to the new virtual machine based on the fifth network configuration, a packet sent by the another virtual machine; and the second virtual switch sends, to the another virtual machine based on the seventh network configuration, a packet sent by the new virtual machine.

The first virtual switch and the second virtual switch establish a layer-2 network connection between the new virtual machine and the another virtual machine by using packet forwarding.

With reference to the first aspect, or the first implementation of the first aspect, in a second implementation of the first aspect, the new virtual machine and the to-be-migrated virtual machine have a same internet protocol IP address, and the method further includes the following steps: The control node performs a ninth network configuration on the second virtual switch, so that the another virtual machine does not forward the sent packet to the to-be-migrated virtual machine.

If live migration is used in a to-be-migrated virtual machine migration process, the new virtual machine and the to-be-migrated virtual machine have the same internet protocol IP address. The fourth network configuration can prevent the second virtual switch from forwarding the packet sent by the another virtual machine to the to-be-migrated virtual machine after a network connection between the new virtual machine and the another virtual machine is created, and at the same time, reclaim storage space occupied by a deletable forwarding table in the second virtual switch. The deletable forwarding table is that the second virtual switch forwards another sent packet to a forwarding table of the to-be-migrated virtual machine.

According to a third aspect, a data center includes at least one computing device, and each computing device includes a processor and a memory. The processor of the at least one computing device is configured to run a control node, a to-be-migrated virtual machine, a new virtual machine, another virtual machine, a first virtual switch, and a second virtual switch, where the another virtual machine has a communication connection to the to-be-migrated virtual machine, the first virtual switch is configured to connect to the new virtual machine, and the second virtual switch is connected to the another virtual machine.

The control node is configured to: obtain a virtual machine migration message, where the virtual machine migration message includes location information of the first virtual switch; perform first network configuration on the first virtual switch based on the location information of the first virtual switch after the virtual machine migration message is obtained; create the new virtual machine after performing the first network configuration; and perform second network configuration on the second virtual switch.

When the control node deployed in the data center performs virtual machine migration, a network configuration process after the new virtual machine is created is reduced, thereby shortening a network interruption time in a virtual machine migration process, and reducing impact of the virtual machine migration process on a service.

With reference to the third aspect, in a first implementation of the third aspect, the first virtual switch is configured to forward, to the new virtual machine based on the first network configuration, a packet sent by the another virtual machine; and the second virtual switch is configured to forward, to the another virtual machine based on the second network configuration, a packet sent by the new virtual machine.

The first virtual switch and the second virtual switch that are deployed in the data center establish a layer-2 network connection between the new virtual machine and the another virtual machine by using packet forwarding.

With reference to the third aspect, or the first implementation of the third aspect, in a second implementation of the third aspect, the processor of the at least one computing device of the data center is further configured to run a router and a cross-subnet virtual machine, where the router is deployed in a virtual network in which the to-be-migrated virtual machine is located; and the cross-subnet virtual machine and the to-be-migrated virtual machine are located in different subnets. The control node is further configured to perform third network configuration on the router. The router is configured to: forward, to the new virtual machine based on the third network configuration, a packet sent by the cross-subnet virtual machine, and forward, to the cross-subnet virtual machine, the packet sent by the new virtual machine.

The control node and the router that are deployed in the data center establish, by using the third network configuration, a layer 3 network connection between the new virtual machine and the cross-subnet virtual machine, thereby implementing network communication between the new virtual machine and the cross-subnet virtual machine.

With reference to the third aspect, or the first or the second implementation of the third aspect, in a third implementation of the third aspect, the new virtual machine and the to-be-migrated virtual machine have a same internet protocol IP address. The control node is further configured to perform fourth network configuration on the second virtual switch, so that the another virtual machine does not forward the sent packet to the to-be-migrated virtual machine.

The control node deployed in the data center can prevent, by using the fourth network configuration, the second virtual switch from forwarding the packet sent by the another virtual machine to the to-be-migrated virtual machine after a network connection between the new virtual machine and the another virtual machine is created, and at the same time, reclaim storage space occupied by a deletable forwarding table in the second virtual switch. The deletable forwarding table is that the second virtual switch forwards another sent packet to a forwarding table of the to-be-migrated virtual machine.

According to a fourth aspect, a data center includes at least one computing device, and each computing device includes a processor and a memory. The processor of the at least one computing device is configured to run a control node, a to-be-migrated virtual machine, a new virtual machine, another virtual machine, a cross-subnet virtual machine, a first virtual switch, a second virtual switch, and a router, where the another virtual machine has a communication connection to the to-be-migrated virtual machine, the cross-subnet virtual machine and the to-be-migrated virtual machine are located in different subnets, the first virtual switch is configured to connect to the new virtual machine, the second virtual switch is connected to the another virtual machine, and the router is deployed in a virtual network in which the to-be-migrated virtual machine is located. The control node is configured to: obtain a virtual machine migration message, where the virtual machine migration message includes location information of the first virtual switch; perform fifth network configuration on the first virtual switch based on the location information of the first virtual switch after the virtual machine migration message is obtained, and perform sixth network configuration on a router; create the new virtual machine after performing the fifth network configuration and the sixth network configuration; perform seventh network configuration on the second virtual switch; and perform eighth network configuration on the router. The router is configured to: forward, to the cross-subnet virtual machine based on the sixth network configuration, a packet sent by the new virtual machine, and forward, to the new virtual machine based on the eighth network configuration, a packet sent by the cross-subnet virtual machine.

Same as the data center in the third aspect, in the method, a network configuration process after the new virtual machine is created is reduced, thereby shortening a network interruption time in a virtual machine migration process, and reducing impact of the virtual machine migration process on a service. In the method, without affecting communication of the to-be-migrated virtual machine, the fifth network configuration for the first virtual switch and a part of network configuration for the router, namely, the sixth network configuration, is completed, so that the network configuration process after the new virtual machine is created is further reduced, thereby further shortening the network interruption time in the virtual machine migration process, and reducing the impact of the virtual machine migration process on the service.

With reference to the fourth aspect, in a first implementation of the fourth aspect, the first virtual switch is configured to send, to the new virtual machine based on the fifth network configuration, a packet sent by the another virtual machine; and the second virtual switch is configured to send, to the another virtual machine based on the seventh network configuration, a packet sent by the new virtual machine.

The first virtual switch and the second virtual switch establish a layer-2 network connection between the new virtual machine and the another virtual machine by using packet forwarding.

According to a fifth aspect, a control node is configured to migrate a to-be-migrated virtual machine, and the control node includes an interface unit, a network configuration unit, and a virtual machine creation unit. The interface unit is configured to obtain a virtual machine migration message, where the virtual machine migration message includes location information of a first virtual switch, and the first virtual switch is configured to connect to a new virtual machine. The network configuration unit is configured to: perform first network configuration on the first virtual switch based on the location information of the first virtual switch that is obtained by the interface unit, where the first virtual switch forwards, to the new virtual machine, a packet sent by another virtual machine, and the another virtual machine has a communication connection to the to-be-migrated virtual machine; and perform second network configuration on a second virtual switch, so that the second virtual switch forwards, to the another virtual machine based on the second network configuration, a packet sent by the new virtual machine, where the second virtual switch is connected to the another virtual machine. The virtual machine creation unit is configured to create the new virtual machine after the network configuration unit completes the first network configuration.

Before the new virtual machine is created, the control node completes a part of network configuration in a virtual machine migration process, that is, the first network configuration for the first virtual switch does not affect a network connection of the to-be-migrated virtual machine, so that the first network configuration may be skipped in a network configuration process after the new virtual machine is created, and only the second network configuration is performed. The network configuration process after the new virtual machine is created may cause interruption of a virtual machine network connection. However, in the method, the network configuration process after the new virtual machine is created is reduced, thereby shortening a network interruption time in a virtual machine migration process, and reducing impact of the virtual machine migration process on a service.

With reference to the fifth aspect, in a first implementation of the fifth aspect, the network configuration unit is further configured to perform third network configuration on a router, so that the router forwards, to the new virtual machine based on the third network configuration, a packet sent by a cross-subnet virtual machine, and forwards, to the cross-subnet virtual machine, a packet sent by the new virtual machine, where the router is deployed in a virtual network in which the to-be-migrated virtual machine is located, and the cross-subnet virtual machine and the to-be-migrated virtual machine are located in different subnets.

With reference to the fifth aspect, or the first implementation of the fifth aspect, in a second implementation of the fifth aspect, the new virtual machine and the to-be-migrated virtual machine have a same internet protocol IP address, and the network configuration unit is further configured to perform fourth network configuration on the second virtual switch, so that the another virtual machine does not forward the sent packet to the to-be-migrated virtual machine.

According to a sixth aspect, a control node is configured to migrate a to-be-migrated virtual machine, and the control node includes an interface unit, a network configuration unit, and a virtual machine creation unit. The interface unit is configured to obtain a virtual machine migration message, where the virtual machine migration message includes location information of a first virtual switch, and the first virtual switch is configured to connect to a new virtual machine. The network configuration unit is configured to: perform fifth network configuration on the first virtual switch based on the location information of the first virtual switch that is obtained by the interface unit, so that the first virtual switch forwards, to the new virtual machine based on the fifth network configuration, a packet sent by another virtual machine, where the another virtual machine has a communication connection to the to-be-migrated virtual machine; perform sixth network configuration on a router, so that the router forwards, to a cross-subnet virtual machine based on the sixth network configuration, a packet sent by the new virtual machine, where the router is deployed in a virtual network in which the to-be-migrated virtual machine is located, and the cross-subnet virtual machine and the to-be-migrated virtual machine are located in different subnets; perform seventh network configuration on a second virtual switch, so that the second virtual switch forwards, to the another virtual machine based on the second network configuration, the packet sent by the new virtual machine, where the second virtual switch is connected to the another virtual machine; and perform eighth network configuration on the router, so that the router forwards, to the new virtual machine, a packet sent by the cross-subnet virtual machine. The virtual machine creation unit is configured to: create the new virtual machine after the network configuration unit completes the fifth network configuration and the sixth network configuration.

Same as the control node in the sixth aspect, in the method, a network configuration process after the new virtual machine is created is reduced, thereby shortening a network interruption time in a virtual machine migration process, and reducing impact of the virtual machine migration process on a service. In the method, without affecting communication of the to-be-migrated virtual machine, the fifth network configuration for the first virtual switch and a part of network configuration for the router, namely, the sixth network configuration, is completed, so that the network configuration process after the new virtual machine is created is further reduced, thereby further shortening the network interruption time in the virtual machine migration process, and reducing the impact of the virtual machine migration process on the service.

According to a seventh aspect, a computer program product and a nonvolatile computer-readable storage medium include a computer instruction. A processor performs the computer instruction to implement the method according to any one of the implementations of the first aspect.

According to an eighth aspect, a computer program product and a nonvolatile computer-readable storage medium include a computer instruction. A processor performs the computer instruction to implement the method according to any one of the implementations of the second aspect.

According to a ninth aspect, a computing device includes a processor and a memory. The processor of the computing device runs a program instruction in the memory to implement the control node according to any one of the implementations of the fifth aspect.

According to a tenth aspect, a computing device includes a processor and a memory. The processor of the computing device runs a program instruction in the memory to implement the control node according to any one of the implementations of the sixth aspect.

DETAILED DESCRIPTION

Figure 1:
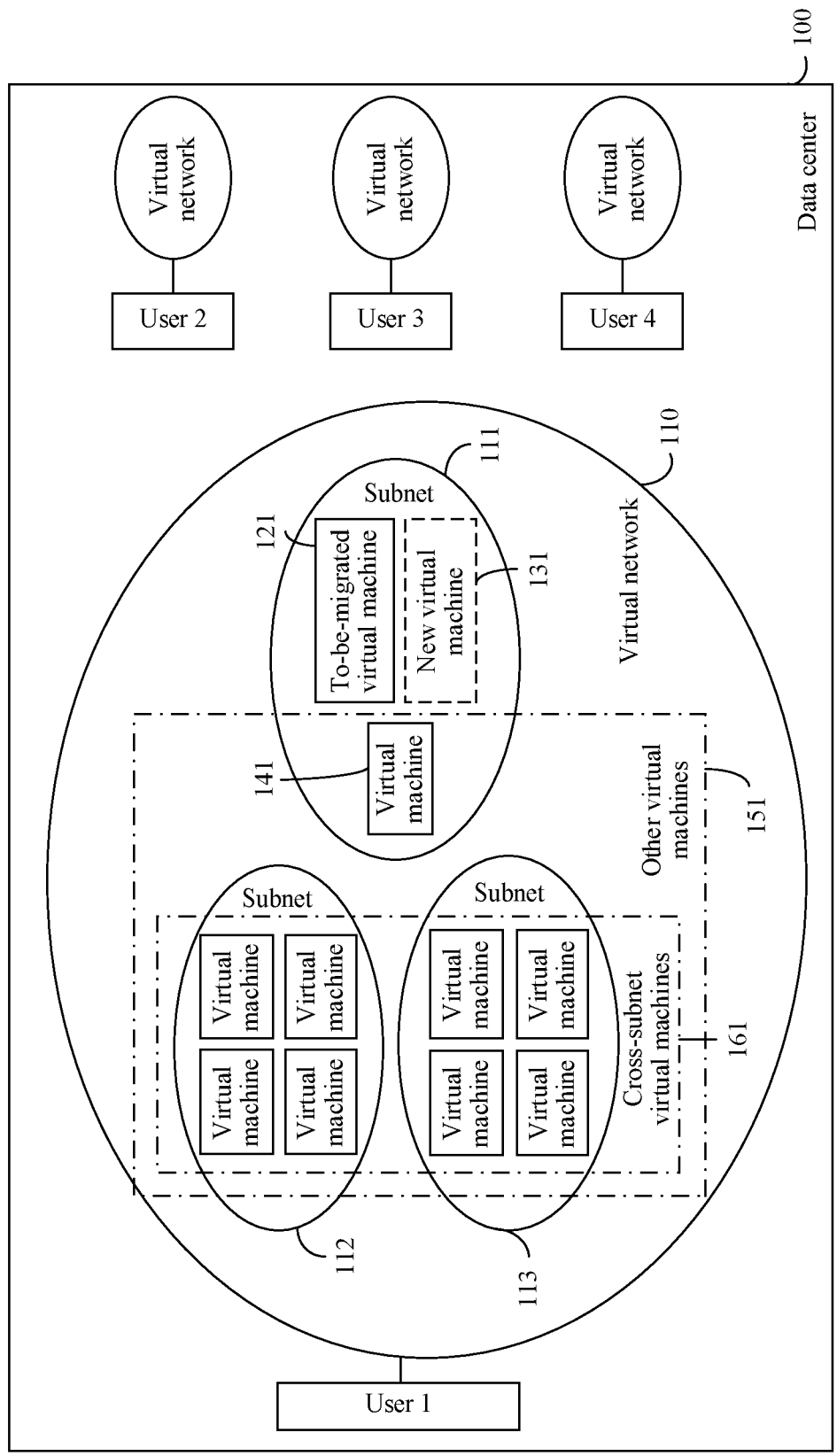
FIG. 1 is a schematic diagram of a data center according to an embodiment.

FIG. 1 is a schematic diagram of a data center 100 according to an embodiment. The data center 100 is oriented to at least one user, and provides services for each user. For example, FIG. 1 shows two users of the data center 100. Virtual machines deployed in the data center are allocated to the users, to provide specific services for the users. The virtual machine allocated to each user is located in a virtual network of the user. Virtual networks of the users are isolated from each other. Each user accesses, through the virtual network of the user, the virtual machine in the virtual network, to obtain a service provided by the data center. Further, the virtual network of each user may include a plurality of subnets, and virtual machines of each user are deployed in different subnets. Deployment of the virtual machines in different subnets may be based on a service requirement or a management requirement. In this embodiment, virtual machines that are located in a same virtual network as a to-be-migrated virtual machine and that have a communication connection to the to-be-migrated virtual machine are referred to as other virtual machines. The other virtual machines further include a cross-subnet virtual machine. The cross-subnet virtual machine is a virtual machine that is in the other virtual machines and that is not in a same subnet as the to-be-migrated virtual machine. The other virtual machines described in this embodiment do not include a new virtual machine.

A user 1 in FIG. 1 is used as an example. Virtual machines allocated to the user 1 are located in a virtual network 110, and the virtual network 110 includes a subnet 111, a subnet 112, and a subnet 113. Virtual machines having a communication connection to a to-be-migrated virtual machine 121 (the communication connection is not shown in FIG. 1) are deployed in the subnet 111, the subnet 112, and the subnet 113, to provide a service for the user 1. Other virtual machines 151 include virtual machines in the subnet 112 and virtual machines in the subnet 113, and a virtual machine 141 in the subnet 111. The virtual machines in the subnet 112 and the virtual machines in the subnet 113 are cross-subnet virtual machines 161. FIG. 1 shows the virtual network including three subnets as an example. In addition, the virtual network of the user may further include two or more subnets. Alternatively, the virtual network of the user may not include a subnet. In other words, all virtual machines of the user are not isolated in terms of a subnet and are interconnected at layer 2. In this case, the virtual machines of the user do not include a cross-subnet virtual machine. The virtual machines of the user except a to-be-migrated virtual machine and a new virtual machine are referred to as other virtual machines.

The user 1 in FIG. 1 is used as an example to describe a virtual machine migration process. Migration of the to-be-migrated virtual machine 121 includes creation of a new virtual machine 131, and establishment of a communication connection between the new virtual machine 131 and the other virtual machines 151, including the cross-subnet virtual machines 161. In addition, the migration of the to-be-migrated virtual machine 121 further includes deletion of the to-be-migrated virtual machine 121, and deletion of the communication connection between the new virtual machine 131 and the other virtual machines 151, including the cross-subnet virtual machines 161.

An embodiment provides a virtual machine migration method. In a virtual machine live migration process, network migration is divided into two phases: Before a new virtual machine is created, a part of a process of the network migration is completed without interrupting a network connection of a to-be-migrated virtual machine. After the new virtual machine is created, the network connection of the to-be-migrated virtual machine is interrupted and a network connection of the new virtual machine is established. In this case, a network interruption time throughout the virtual machine live migration is shortened to a time used for establishing the network connection.

In this embodiment, a communication connection between virtual machines is implemented by a virtual switch and a router of a virtual network in which the virtual machines are located. The router may be a virtual router or a distributed virtual router. In this embodiment, a virtual switch connected to the new virtual machine is referred to as a first virtual switch, and a virtual switch connected to other virtual machines (including cross-subnet virtual machines) is referred to as a second virtual switch.

Figure 2:
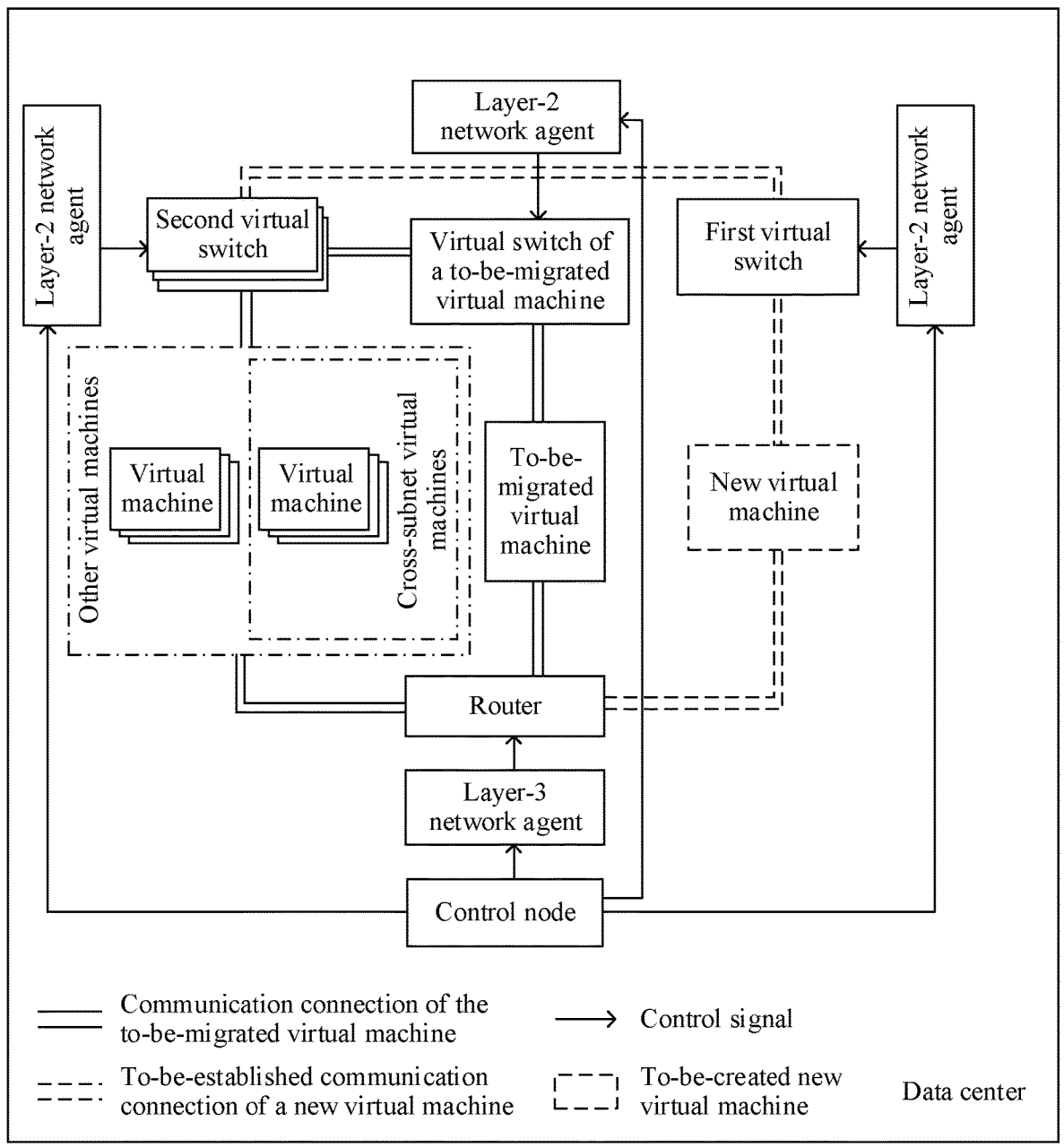
FIG. 2 is a schematic diagram of a communication connection of a data center according to an embodiment.

OpenStack is a common public cloud management platform. A data center in this embodiment may be based on OpenStack. A communication connection of a data center provided in an embodiment is shown in FIG. 2. The data center includes a virtual network (not shown in FIG. 2). The virtual network includes at least one virtual machine, and the at least one virtual machine includes a to-be-migrated virtual machine and other virtual machines. If subnets are deployed in the virtual network, the other virtual machines alternatively include cross-subnet virtual machines. FIG. 2 further shows a new virtual machine to which the to-be-migrated virtual machine is migrated, a first virtual switch connected to the new virtual machine, a virtual switch connected to the to-be-migrated virtual machine, a second virtual switch and a router that are connected to the other virtual machines. In addition, the data center shown in FIG. 2 further includes a control node.

Figure 3:
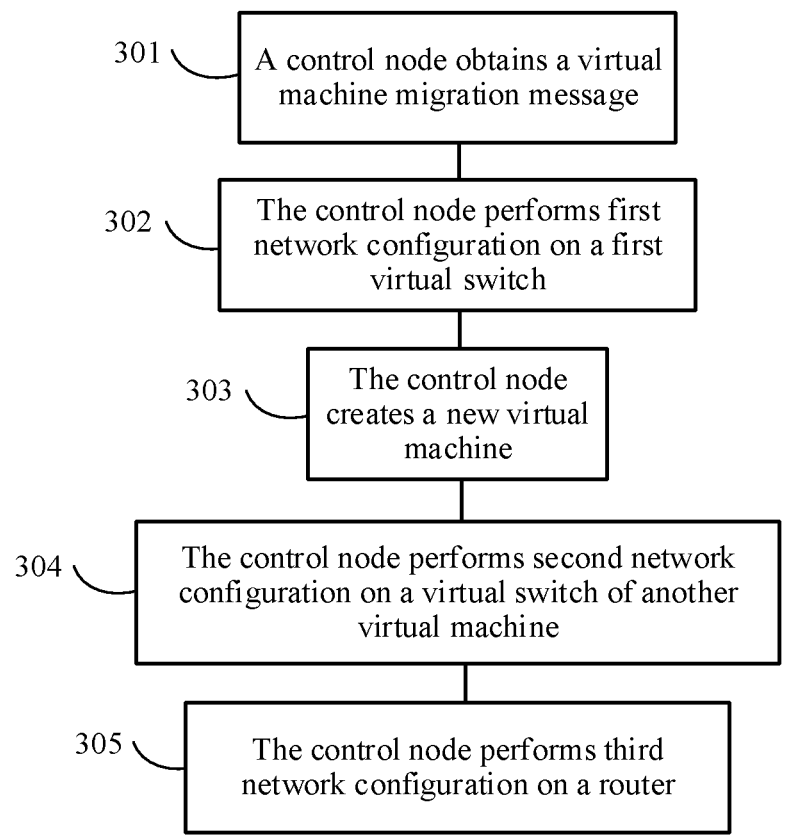
FIG. 3 is a schematic diagram of a virtual machine migration method according to an embodiment.

Based on the data center shown in FIG. 2, an embodiment provides a virtual machine migration method, as shown in FIG. 3.

S301. A control node obtains a virtual machine migration message.

A user initiates a requirement for migrating a to-be-migrated virtual machine, and the control node obtains the virtual machine migration message. The virtual machine migration message includes location information of a first virtual switch. In this case, the first virtual switch is already created, but the new virtual machine is not yet created. The location information of the first virtual switch that is included in the virtual machine migration message is used to determine the first virtual switch connected to the new virtual machine.

S302. The control node performs first network configuration on the first virtual switch, so that the first virtual switch can forward, to the new virtual machine based on the first network configuration, a packet sent by another virtual machine, and a communication tunnel between the new virtual machine and the another virtual machine is created on a side of the new virtual machine.

In this case, the new virtual machine is not yet created, and the first network configuration only enables the first virtual switch to have a packet forwarding capability. Configuring only the first virtual switch does not affect forwarding of a packet related to the to-be-migrated virtual machine by a second virtual switch. Therefore, the first network configuration does not affect communication between the to-be-migrated virtual machine and the another virtual machine. In a flow table-based forwarding scenario, the first network configuration may be implemented by delivering a flow table on the first virtual switch. The control node instructs a layer-2 network agent of the first virtual switch to complete the first network configuration for the first virtual switch.

The configuration performed on the first virtual switch enables the first virtual switch to have the packet forwarding capability. Although the new virtual machine is not yet created at this time, a network between the another virtual machine and the new virtual machine is not established either, and the first virtual switch receives no packet from the new virtual machine or the another virtual machine, once creation of the new virtual machine and establishment of a network connection are completed, the first virtual switch may complete packet forwarding based on the first network configuration.

S303. The control node creates the new virtual machine after performing the first network configuration.

S304. The control node performs second network configuration on the second virtual switch, so that the second virtual switch can forward, to the another virtual machine based on the second network configuration, a packet sent by the new virtual machine.

After the new virtual machine is created, a computing agent of a host on which the to-be-migrated virtual machine is located instructs the control node to perform the second network configuration on the second virtual switch. In a flow table-based scenario, a forwarding flow table is delivered on each second virtual switch connected to each of other virtual machines, and each second virtual switch forwards, to the new virtual machine based on the forwarding flow table, a packet sent by the another virtual machine, and forwards, to the another virtual machine, the packet sent by the new virtual machine. The control node instructs a layer-2 network agent of the second virtual switch to complete the second network configuration for the second virtual switch.

S305. The control node performs third network configuration on a router, so that the router can forward, to the new virtual machine based on the third network configuration, a packet sent by a cross-subnet virtual machine, and forward, to the cross-subnet virtual machine, a packet sent by the new virtual machine.

The another virtual machine further includes the cross-subnet virtual machine that is not in a same subnet as the to-be-migrated virtual machine. To implement communication between the new virtual machine and the cross-subnet virtual machine, the control node further needs to perform the third configuration on the router of a virtual network in which the to-be-migrated virtual machine is located. A specific implementation includes that a routing table is delivered on the router, so that the router can perform the third configuration. The router forwards, to the new virtual machine based on the third network configuration, the packet sent by the cross-subnet virtual machine, and forwards, to the cross-subnet virtual machine, the packet sent by the new virtual machine. The control node instructs a layer-3 network agent of the router to complete the third network configuration for the router.

Further, in a virtual machine live migration scenario, the new virtual machine and a destination virtual machine have a same IP address. After a network connection between the new virtual machine and the another virtual machine is created, to prevent the second virtual switch from forwarding, to the to-be-migrated virtual machine, the packet sent by another virtual machine, the control node further needs to perform fourth network configuration on the second virtual switch. Specifically, the fourth network configuration includes deleting a flow table used by the second virtual switch to forward, to the to-be-migrated virtual machine, the packet sent by another virtual machine. The flow table is deleted so that the another virtual machine cannot forward the sent packet to the to-be-migrated virtual machine.

In addition, after the new virtual machine and the network connection between the new virtual machine and the another virtual machine are created, a process of migrating the to-be-migrated virtual machine to the new virtual machine further includes deleting the to-be-migrated virtual machine and deleting the network connection between the to-be-migrated virtual machine and the another virtual machine. Details are not described in this embodiment.

According to the method provided in this embodiment, a network interruption time in a process of a to-be-migrated virtual machine live migration is shortened. Before the new virtual machine is created, a part of network configuration is first completed, that is, the first network configuration does not interrupt a network connection of the to-be-migrated virtual machine. After the new virtual machine is created, remaining network configuration is completed to implement the to-be-migrated virtual machine live migration. In this method, a time in a network in the process of the to-be-migrated virtual machine live migration is shortened, so that a breakdown time of a service provided by the data center in the process of the to-be-migrated virtual machine live migration is reduced, and stability of the service of the data center is improved.

It can be learned from the foregoing method that, to implement communication between the new virtual machine and the cross-subnet virtual machine, the control node further needs to configure the router of the virtual network in which the to-be-migrated virtual machine is located. Configuring of the router includes two aspects. First, the router forwards, to the new virtual machine based on the configuration, the packet sent by the cross-subnet virtual machine; second, the router forwards, to the cross-subnet virtual machine, the packet sent by the new virtual machine. Before the new virtual machine is created, the router is configured, so that the router can forward, to the cross-subnet virtual machine, the packet sent by the new virtual machine. This does not affect the network connection of the to-be-migrated virtual machine, further reducing configuration steps after the new virtual machine is created, and further shortening a network interruption time.

Figure 4:
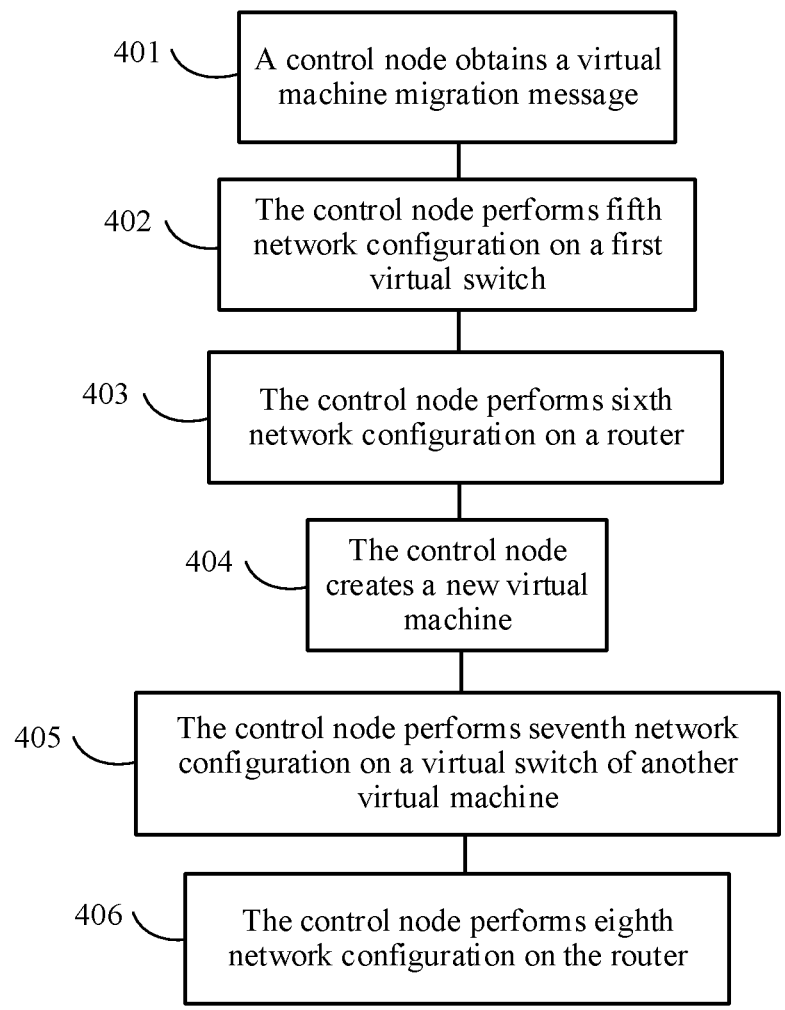
FIG. 4 is a schematic diagram of another virtual machine migration method according to an embodiment.

Based on the data center shown in FIG. 2, an embodiment provides another virtual machine migration method, as shown in FIG. 4.

S401. A control node obtains a virtual machine migration message.

Same as S301, a user initiates a requirement for migrating a to-be-migrated virtual machine, and the control node obtains the virtual machine migration message. The control node obtains, based on the virtual machine migration message, location information of a first virtual switch connected to a new virtual machine.

The user initiates the requirement for migrating the to-be-migrated virtual machine, and the control node obtains the virtual machine migration message. The virtual machine migration message includes the location information of the first virtual switch. In this case, the first virtual switch is already created, but the new virtual machine is not created. The location information of the first virtual switch that is included in the virtual machine migration message is used to determine the first virtual switch connected to the new virtual machine.

S402. The control node performs fifth network configuration on the first virtual switch, so that the first virtual switch can forward, to the new virtual machine based on first network configuration, a packet sent by another virtual machine.

In this case, the new virtual machine is not yet created, and the fifth network configuration only enables the first virtual switch to have a packet forwarding capability. Configuring only the first virtual switch does not affect forwarding of a packet related to the to-be-migrated virtual machine by the second virtual switch. Therefore, the first network configuration does not affect communication between the to-be-migrated virtual machine and the another virtual machine. In a flow table-based forwarding scenario, the fifth network configuration may be implemented by delivering a flow table on the first virtual switch. The control node instructs a layer-2 network agent of the first virtual switch to complete the fifth network configuration for the first virtual switch.

S403. The control node performs sixth network configuration on the router, so that the router can forward, to a cross-subnet virtual machine based on the sixth network configuration, a packet sent by the new virtual machine.

To implement communication between the new virtual machine and the cross-subnet virtual machine, the control node performs the sixth network configuration on the router of a virtual network in which the to-be-migrated virtual machine is located, and configures a layer-3 network connection of the new virtual machine. A specific implementation includes that a routing table is delivered on the router, so that the router can perform the sixth network configuration. The router forwards, to the cross-subnet virtual machine based on the sixth network configuration, the packet sent by the new virtual machine. Similarly, at this time, the new virtual machine is not yet created, and the router does not receive the packet sent by the new virtual machine to the cross-subnet virtual machine. Therefore, the sixth network configuration does not affect a network connection of the to-be-migrated virtual machine. The configuration of the router enables the router to have a capability of forwarding, to the cross-subnet virtual machine, the packet sent by the new virtual machine, thereby shortening a time for configuring a network connection of the new virtual machine after the network connection of the to-be-migrated virtual machine is interrupted. Once the virtual machine completes creation of the new virtual machine and establishment of a network connection, the router may complete packet forwarding based on the sixth network configuration. The control node instructs a layer-3 network agent of the router to complete the sixth network configuration for the router.

In another implementation, because the new virtual machine is not yet created, an implementation sequence of S402 and S403 may be adjusted, that is, after S401, S403 is performed, and then S402 is performed. This is not limited in this embodiment.

S404. The control node creates the new virtual machine after performing the fifth network configuration and the sixth network configuration.

S405. The control node performs seventh network configuration on a second virtual switch, so that the second virtual switch can forward, to another virtual machine based on the seventh network configuration, a packet sent by the new virtual machine. The control node instructs a layer-2 network agent of the second virtual switch to complete the seventh network configuration for the second virtual switch.

After the new virtual machine is created, a computing agent of a host on which the to-be-migrated virtual machine is located instructs the control node to perform the seventh network configuration on the second virtual switch. In a flow table-based scenario, a forwarding flow table is delivered on each second virtual switch connected to each of other virtual machines, and each second virtual switch forwards, to the new virtual machine based on the forwarding flow table, a packet sent by the another virtual machine, and forwards, to the another virtual machine, the packet sent by the new virtual machine.

S406. The control node performs eighth network configuration on the router, so that the router can forward, to the new virtual machine based on the eighth network configuration, a packet sent by the cross-subnet virtual machine. The control node instructs the layer-3 network agent of the router to complete the eighth network configuration for the router.

In another implementation, an implementation sequence of S405 and S406 may be adjusted, that is, after S404, S406 is performed, and then S405 is performed.

The another virtual machine further includes the cross-subnet virtual machine that is not in a same subnet as the to-be-migrated virtual machine. To implement communication between the new virtual machine and the cross-subnet virtual machine, the control node further needs to perform the eighth network configuration on the router of a virtual network in which the to-be-migrated virtual machine is located. A specific implementation includes that a routing table is delivered on the router, so that the router can perform the eighth network configuration. The router forwards, to the new virtual machine based on the eighth network configuration, the packet sent by the cross-subnet virtual machine, and forwards, to the cross-subnet virtual machine, the packet sent by the new virtual machine.

Further, in a virtual machine live migration scenario, the new virtual machine and a destination virtual machine have a same IP address. After a network connection between the new virtual machine and the another virtual machine is created, to prevent the second virtual switch from forwarding, to the to-be-migrated virtual machine, the packet sent by another virtual machine, the control node further needs to perform ninth network configuration on the second virtual switch. Specifically, the ninth network configuration includes deleting a flow table used by the second virtual switch to forward, to the to-be-migrated virtual machine, the packet sent by another virtual machine. The flow table is deleted so that the another virtual machine cannot forward the sent packet to the to-be-migrated virtual machine.

In addition, after the new virtual machine and the network connection between the new virtual machine and the another virtual machine are created, a process of migrating the to-be-migrated virtual machine to the new virtual machine further includes deleting the to-be-migrated virtual machine and deleting the network connection between the to-be-migrated virtual machine and the another virtual machine. Details are not described in this embodiment.

In this embodiment, after the new virtual machine is created, configuration of a network of the to-be-migrated virtual machine by the control node further includes: instructing the computing agent of the host on which the to-be-migrated virtual machine is located to bring a port of the to-be-migrated virtual machine offline, instructing a computing agent of the host on which the new virtual machine is located to set a state of the new virtual machine to active, and the like. In addition, in the network migration process of the to-be-migrated virtual machine, a host binding relationship needs to be updated on the control node, that is, a binding relationship between the to-be-migrated virtual machine and the host on which the to-be-migrated virtual machine is located is deleted, and a binding relationship between the new virtual machine and the host on which the new virtual machine is located is added. Further, the new virtual machine and a destination virtual machine have a same Internet Protocol (IP) address, and on a side of the to-be-migrated virtual machine, a port of the to-be-migrated virtual machine needs to be brought offline, and a communication tunnel between the to-be-migrated virtual machine and the another virtual machine needs to be deleted.

The control node in this embodiment includes the control node of the data center in FIG. 2, and may include a computing control node and a network control node. The computing control node is configured to implement management of each virtual machine process, and the network control node is configured to manage each virtual machine network. The computing control node further includes a first computing control node and a second computing control node. The first computing control node is configured to manage the to-be-migrated virtual machine, and the second computing control node is configured to manage the new virtual machine.

In a process of migrating the to-be-migrated virtual machine, the computing control node and the network control node cooperate to perform the method steps performed by the foregoing control node. Specifically, that the foregoing control node obtains the virtual machine migration message includes that the first computing control node and the network control node separately receive the virtual machine migration message, and complete pre-processing before migration of the to-be-migrated virtual machine. That the control node performs the first network configuration to the eighth network configuration includes that the network control node receives a message from the first computing control node, and performs the first network configuration to the eighth network configuration. That the control node receives the new virtual machine includes that the first computing node creates a message from the network control node, and creates the new virtual machine. The pre-processing before migration of the to-be-migrated virtual machine includes creation of a backend port of the new virtual machine. The creation of the backend port of the new virtual machine is to create, on the second virtual switch, a backend port corresponding to the new virtual machine before the new virtual machine is created, so that the new virtual machine can be connected to the second virtual switch after being created. For more detailed configuration steps, refer to descriptions in FIG. 4 and FIG. 5A to FIG. 5C.

In addition, in the data center in FIG. 2, each virtual switch has a corresponding layer-2 network agent, and a router has a corresponding layer-3 network agent. The network control node configures each virtual switch by using the corresponding layer-2 network agent and the corresponding layer-3 network agent. Specifically, the network control node instructs the layer-2 network agent of each virtual switch to perform network configuration on each virtual switch. In a flow table-based network scenario, the network control node instructs the layer-2 network agent of each virtual switch to separately deliver a forwarding flow table on each virtual switch to complete configuration. The network control node instructs the layer-3 network agent of the router to perform network configuration on the router, that is, the network control node instructs the layer-3 network agent of the router to deliver a routing table on the router to complete router configuration.

Figure 5A:
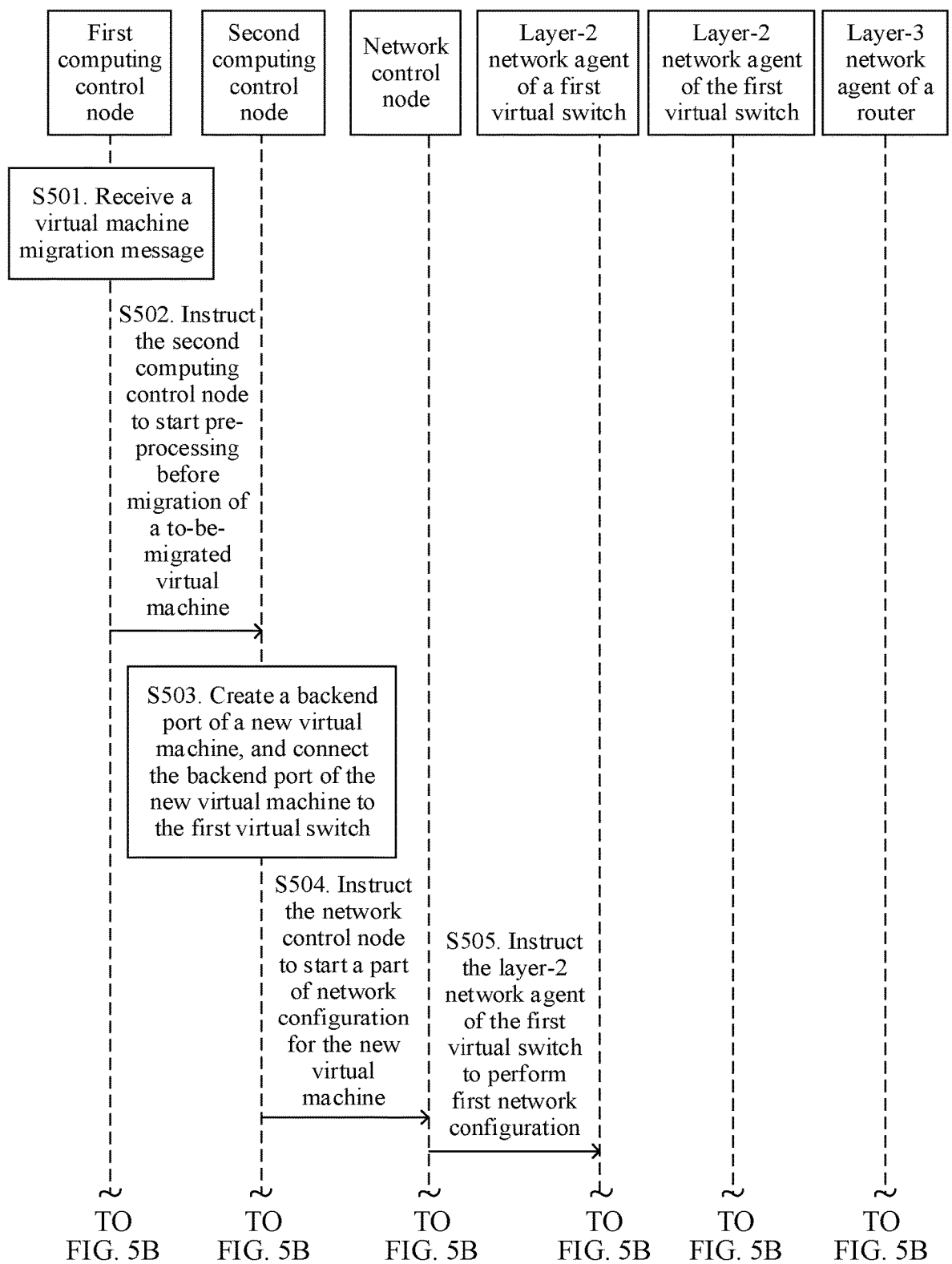
FIG. 5A to FIG. 5C are a schematic diagram of a virtual machine migration method based on a network control node and a computing control node according to an embodiment.
Figure 5B:
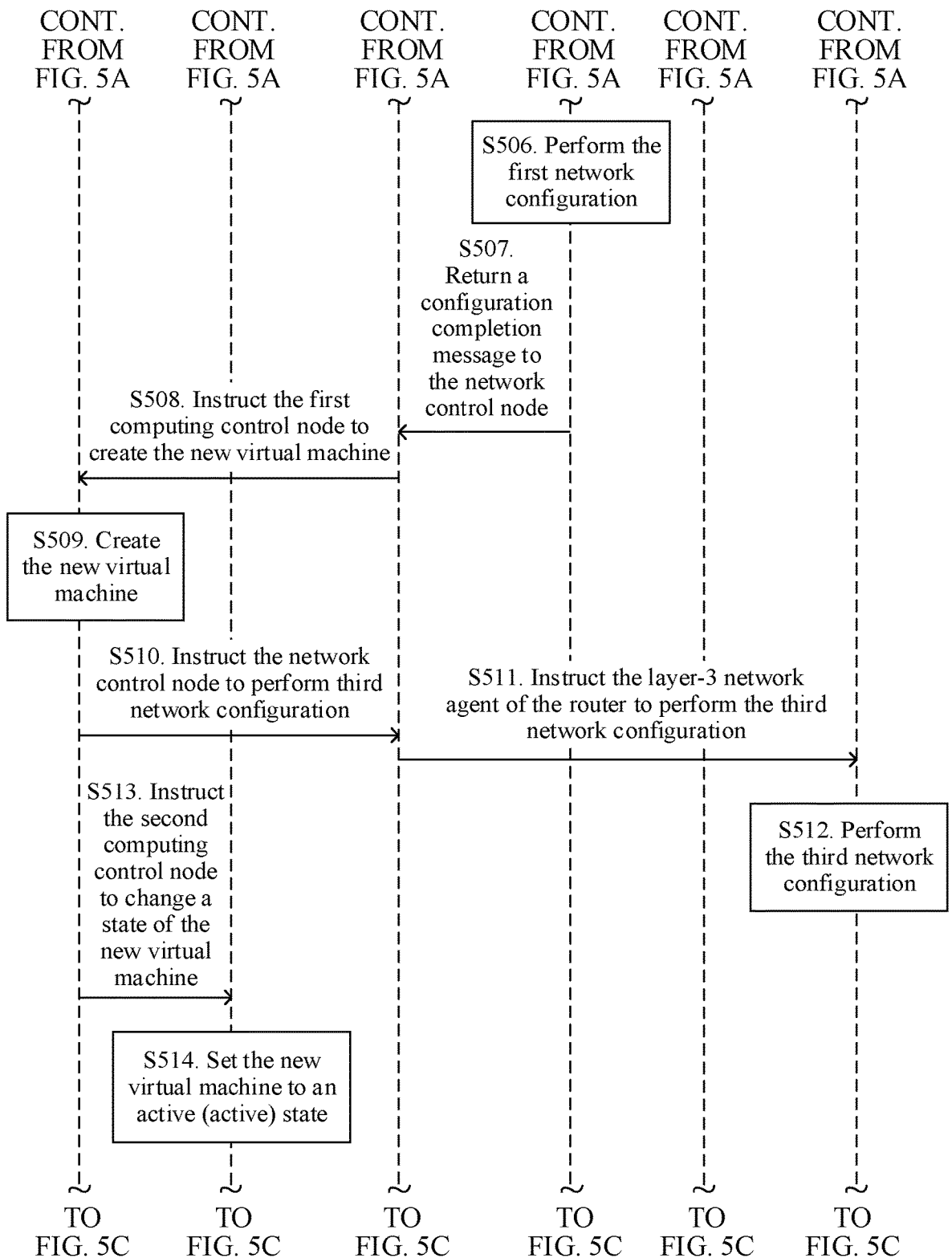
Figure 5C:
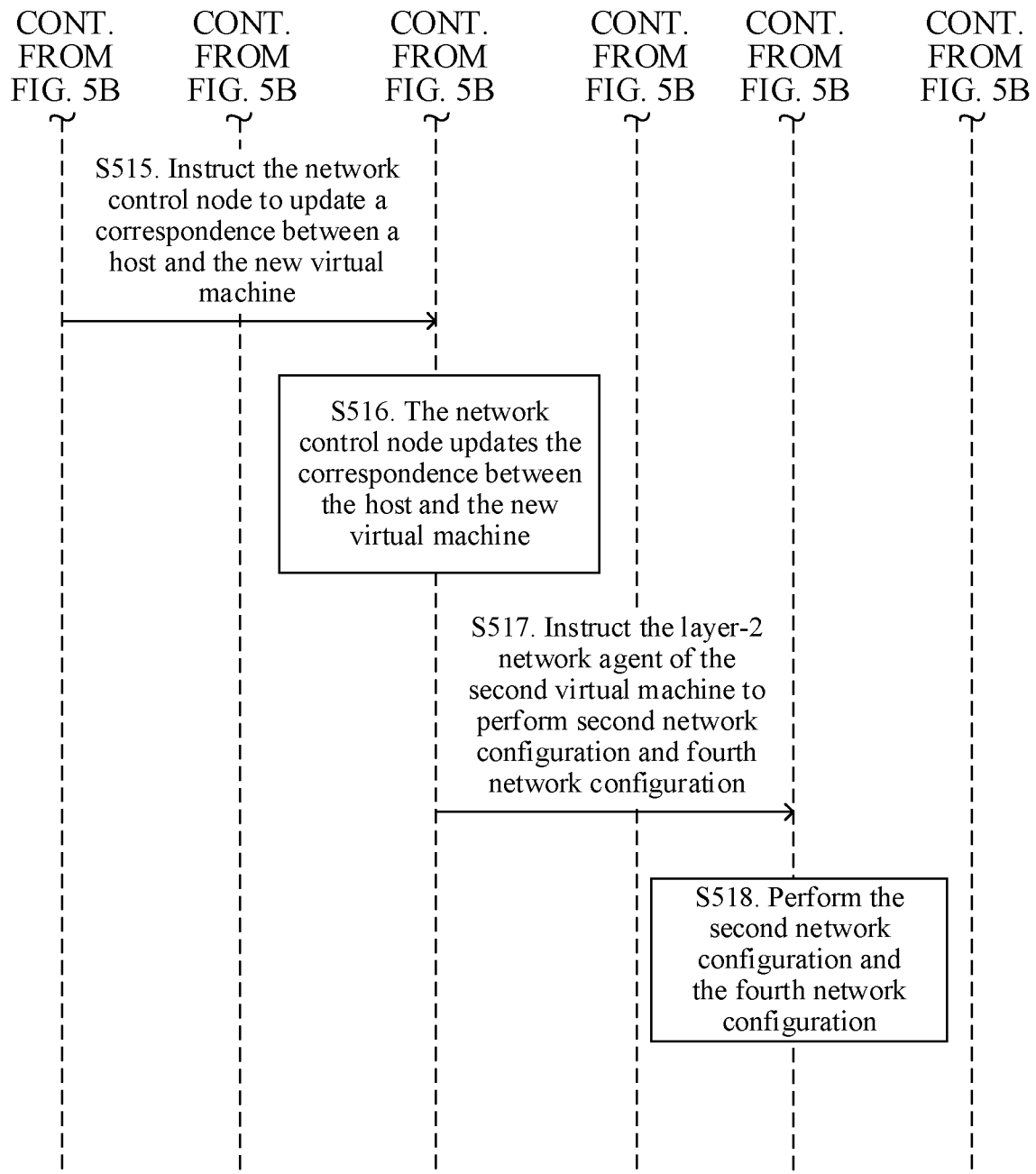

Based on the data center including the computing control node and the network control node, an embodiment provides a virtual machine migration method, as shown in FIG. 5A to FIG. 5C.

S501. A first computing control node receives a virtual machine migration message.

S502. The first computing control node instructs a second computing control node to start pre-processing before migration of a to-be-migrated virtual machine, namely, creation of a backend port of a new virtual machine.

S503. The second computing control node creates the backend port of the new virtual machine, and connects the backend port of the new virtual machine to a first virtual switch.

S504. After the back-end port of the new virtual machine is created, the second computing control node instructs a network control node to start a part of network configuration for the new virtual machine. A notification interface between the second computing control node and the network control node includes but is not limited to an event notification.

S505. The network control node receives a notification from the second computing control node, and instructs a layer-2 network agent of the first virtual switch to perform first network configuration.

S506. The layer-2 network agent of the first virtual switch receives a notification from the network control node, and performs the first network configuration.

S507. After performing the first network configuration, the layer-2 network agent of the first virtual switch returns a configuration completion message to the network control node. The configuration completion message may be a port reporting message. Specifically, the layer-2 network agent of the first virtual switch delivers a forwarding flow table on a destination virtual switch, and the forwarding flow table instructs the destination virtual switch to forward a packet sent by the new virtual machine.

S508. The network control node receives the configuration complete message returned by the layer-2 network agent in S507, and instructs the first computing control node to create the new virtual machine. In this embodiment, the network control node may instruct, by using event communication, the first computing control node to start a to-be-migrated virtual machine live migration. Specifically, the network control node instructs the first computing control node to start the to-be-migrated virtual machine live migration by using a programmable application programming interface (API) provided by the data center.

S509. The first computing control node receives the notification from the network control node, and creates the new virtual machine. This specifically includes creating the new virtual machine based on a disk, a memory, and a device status of the to-be-migrated virtual machine.

S510. After creating the new virtual machine, the first computing node instructs the network control node to perform third network configuration.

S511. The network control node instructs a layer-3 network agent of a router to perform the third network configuration.

S512. The layer-3 network agent of the router receives the notification from the network control node, and performs the third network configuration. If a host on which the new virtual machine is located is the first node of a virtual network in which the to-be-migrated virtual machine is located, sixth network configuration further includes: creating a subnet gateway port and a File Transfer Protocol (FTP) namespace of the new virtual machine, configuring a virtual router of the new virtual machine, adding the new virtual machine to the virtual network in which the to-be-migrated virtual machine is located.

Optionally, after the layer-3 network agent of the router performs the third network configuration, the layer-3 network agent returns a configuration completion message to the network control node, and the configuration completion message may be a path reporting message.

S513. The first computing control node instructs the second computing control node to change a state of the new virtual machine.

S514. The second computing control node receives the notification from the first computing control node, and sets the new virtual machine to an active state.

S515. The first computing control node instructs the network control node to update a correspondence between a host and the new virtual machine.

S516. The network control node updates the correspondence between the host and the new virtual machine.

S516. The network control node instructs a layer-2 network agent of a second virtual switch to perform a second network configuration and fourth network configuration.

S517. The layer-2 network agent of the second virtual switch separately receives notifications from the network control node, performs the second network configuration and the fourth network configuration, and separately delivers and deletes a corresponding forwarding flow table on a corresponding second virtual switch.

In addition, the migration of the to-be-migrated virtual machine further includes deletion of the to-be-migrated virtual machine and deletion of a network connection between the to-be-migrated virtual machine and another virtual machine. Details are not described in this embodiment again.

Figure 6A:
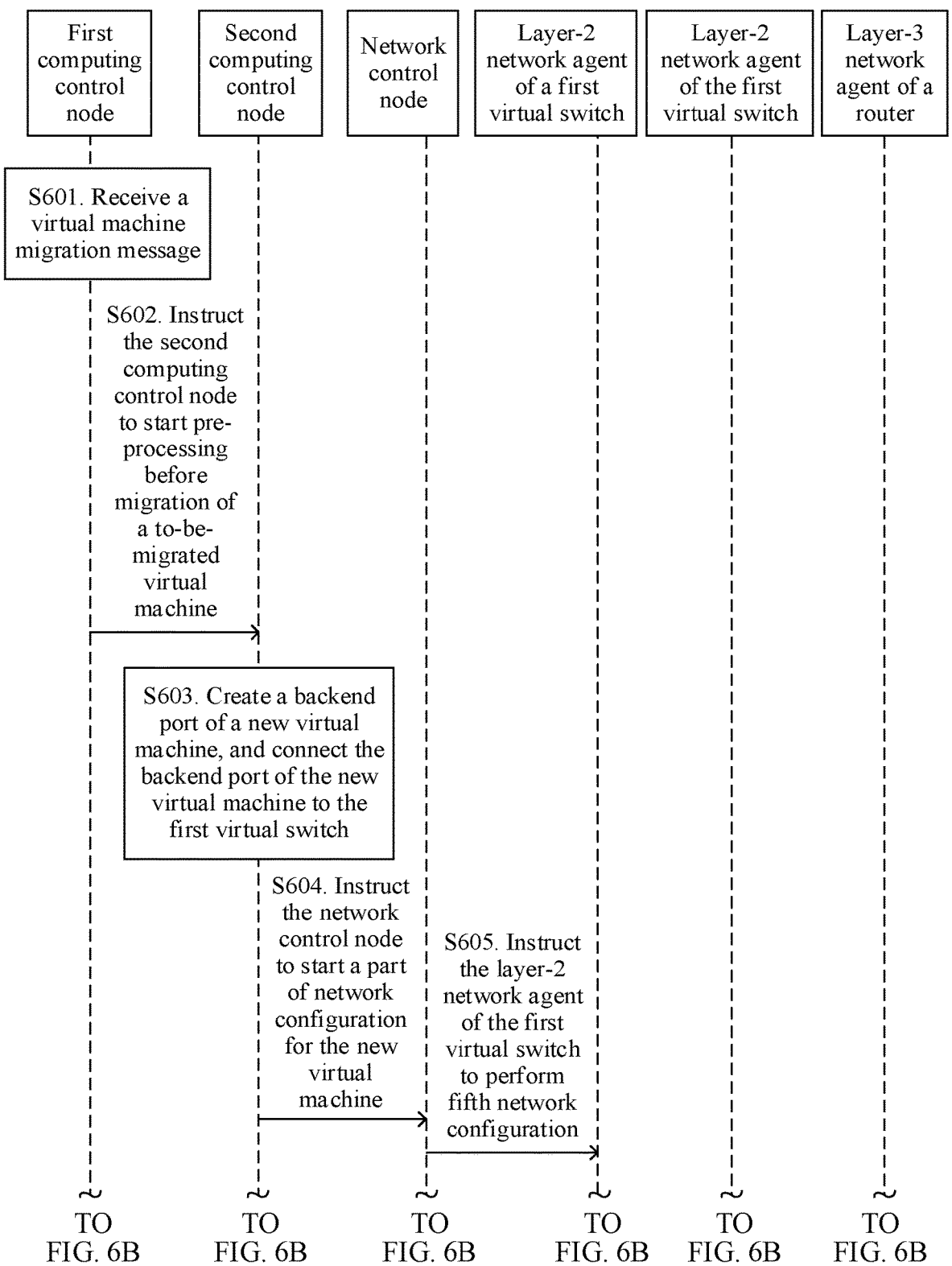
FIG. 6A to FIG. 6C are a schematic diagram of another virtual machine migration method based on a network control node and a computing control node according to an embodiment.
Figure 6B:
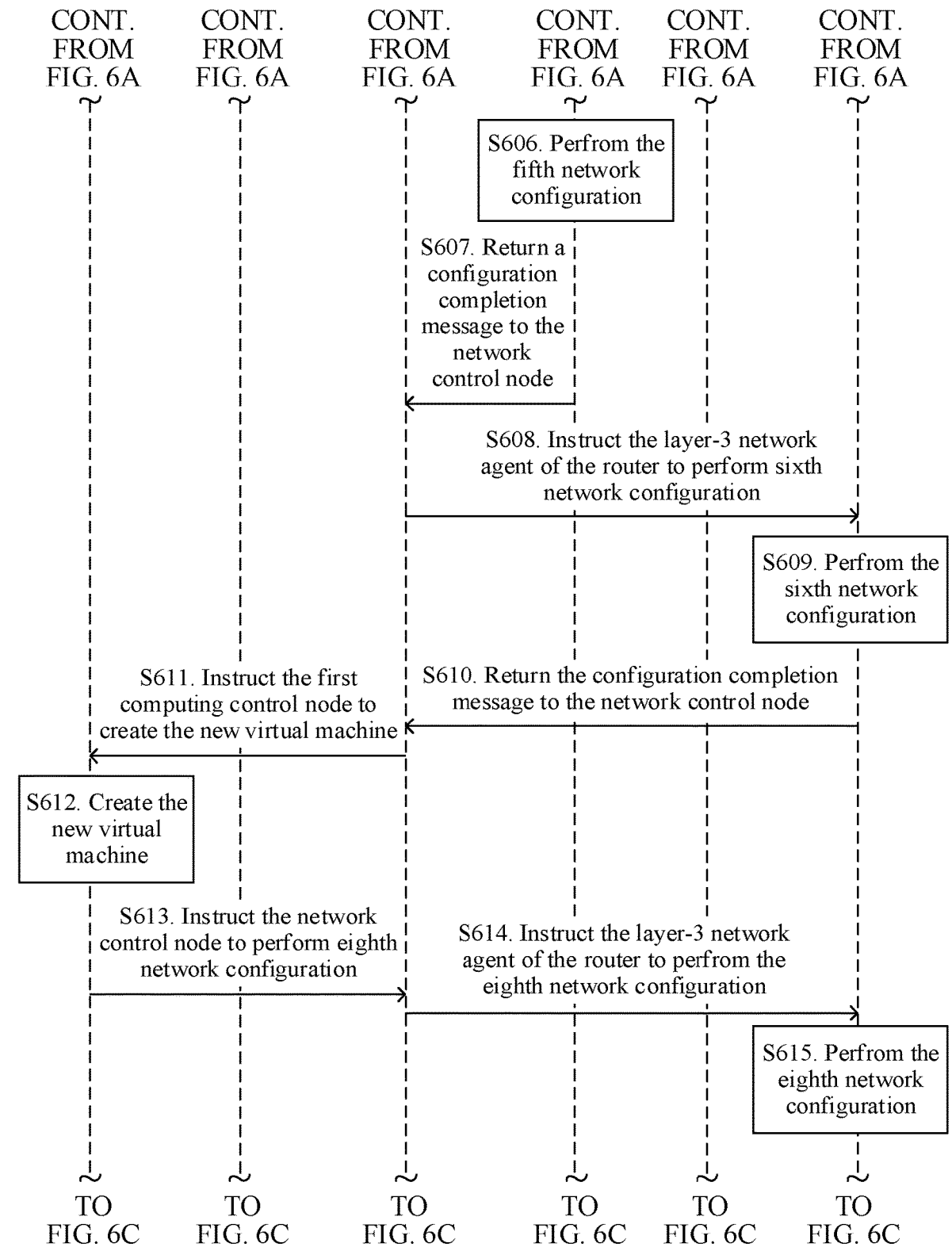
Figure 6C:
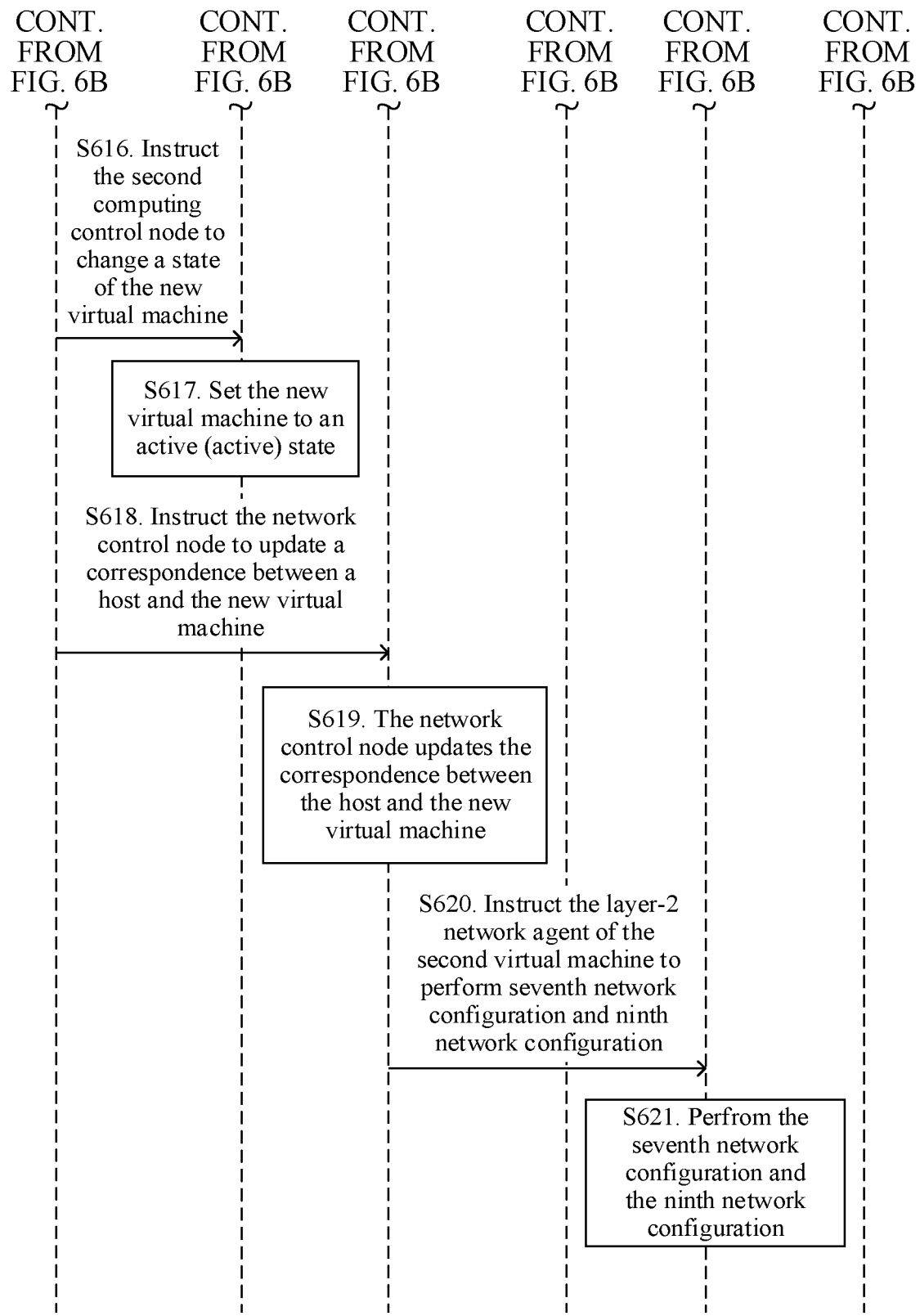

An embodiment further provides a virtual machine migration method, as shown in FIG. 6A to FIG. 6C.

S601. A first computing control node receives a virtual machine migration message.

S602. The first computing control node instructs a second computing control node to start pre-processing before migration of a to-be-migrated virtual machine, namely, creation of a backend port of a new virtual machine.

S603. The second computing control node creates the backend port of the new virtual machine, and connects the backend port of the new virtual machine to a destination virtual switch.

S604. After the back-end port of the new virtual machine is created, the second computing control node instructs a network control node to start a part of network configuration for the new virtual machine. A notification interface between the second computing control node and the network control node includes but is not limited to an event notification.

S605. The network control node receives a notification from the second computing control node, and instructs a layer-2 network agent of the first virtual switch to perform fifth network configuration.

S606. The layer-2 network agent of the first virtual switch receives a notification from the network control node, performs the fifth network configuration, and returns a configuration completion message to the network control node after the fifth network configuration is completed.

S607. After performing the fifth network configuration, the layer-2 network agent of the first virtual switch returns a configuration completion message to the network control node. The configuration completion message may be a port reporting message. Specifically, the layer-2 network agent of the first virtual switch delivers a forwarding flow table on a destination virtual switch, and the forwarding flow table instructs the destination virtual switch to forward a packet sent by the new virtual machine.

S608. The network control node instructs a layer-3 network agent of a router to perform sixth network configuration.

S609. The layer-3 network agent of the router receives the notification from the network control node, and performs the sixth network configuration. If a host on which the new virtual machine is located is the first node of a virtual network in which the to-be-migrated virtual machine is located, sixth network configuration further includes: creating a subnet gateway port and an FTP namespace of the new virtual machine, configuring a virtual router of the new virtual machine, adding the new virtual machine to the virtual network in which the to-be-migrated virtual machine is located.

S610. After the configuration is completed, the layer-3 network agent returns the configuration completion message to the network control node, and the configuration completion message may be a path reporting message.

In this embodiment, a sequence of S605 to S610 may be exchanged. S605 and S608 are separately steps of instructing, by the network control node after receiving a network pre-migration notification, another network node to perform the network pre-migration. S606 and S607 are feedbacks of the layer-2 network agent of the first virtual switch on the notification in S606. S609 and S610 are feedbacks of the layer-2 network agent of the second virtual switch on the notification in S608. After receiving the network pre-migration notification, the network control node may first instruct the layer-3 network agent to configure a virtual router, and then instruct a layer-2 network agent of a host on which the new virtual machine is located to configure the destination virtual switch, that is, a sequence of S605 to S610 may also be: S608, S609, S610, S605, S606, and S607. This is not limited in this embodiment.

S611. The network control node receives the configuration completion message returned by the layer-2 network agent in S607 and the configuration completion message returned by the layer-3 network agent in S608, and instructs the first computing control node to create the new virtual machine. In this embodiment, the network control node may instruct, by using event communication, the first computing control node to start a to-be-migrated virtual machine live migration. Specifically, the network control node instructs the first computing control node to start the to-be-migrated virtual machine live migration by using a programmable API provided by the data center.

S612. The first computing control node receives the notification from the network control node, and creates the new virtual machine. This specifically includes creating the new virtual machine based on a disk, a memory, and a device status of the to-be-migrated virtual machine.

S613. After creating the new virtual machine, the first computing node instructs the network control node to perform eighth network configuration.

S614. The network control node instructs a layer-3 network agent of a router to perform the eighth network configuration.

S615. The layer-3 network agent receives the notification of the network control node, performs the eighth network configuration, delivers a routing table on the router, configures an FTP return route, and triggers sending of a free Address Resolution Protocol (ARP) packet.

S616. The first computing control node instructs the second computing control node to change a state of the new virtual machine.

S617. The second computing control node receives the notification from the first computing control node, sets the new virtual machine to an active state, and instructs the network control node to complete network migration.

S618. The first computing control node instructs the network control node to update a correspondence between the host and the new virtual machine.

S619. The network control node receives the notification from the first computing control node, and updates a correspondence between the new virtual machine and the host on which the new virtual machine is located.

S620. The network control node instructs a layer-2 network agent of a second virtual switch to perform seventh network configuration and ninth network configuration.

S621. The layer-2 network agent of the second virtual switch separately receives the notification from the network control node, performs the seventh network configuration and the ninth network configuration, and separately delivers and deletes a corresponding forwarding flow table on a corresponding second virtual switch.

In addition, the migration of the to-be-migrated virtual machine further includes deletion of the to-be-migrated virtual machine and deletion of a network connection between the to-be-migrated virtual machine and another virtual machine. Details are not described in this embodiment again.

Figure 7:
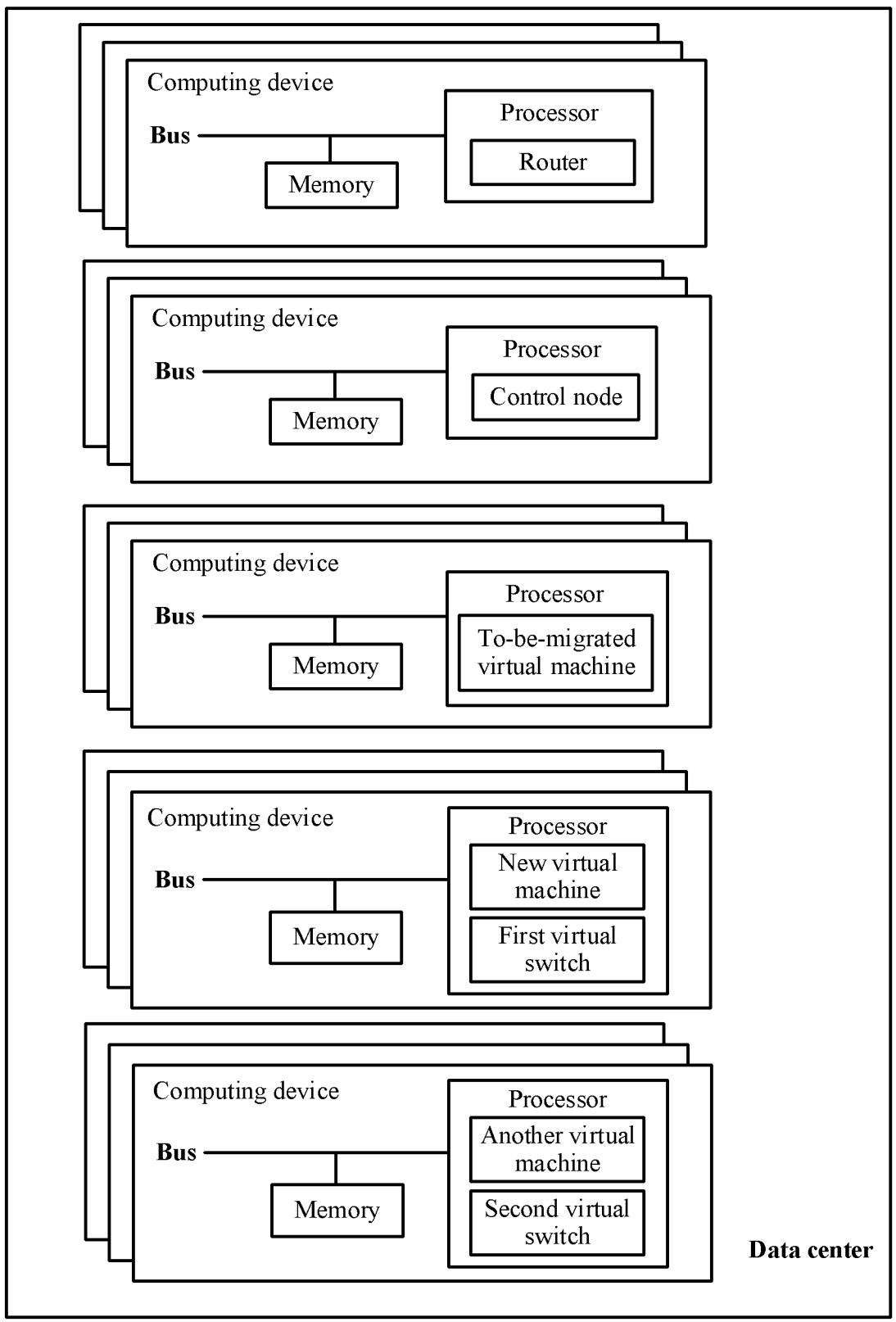
FIG. 7 is a schematic diagram of an implementation of a data center according to an embodiment.

An embodiment provides a data center, as shown in FIG. 7. The data center includes at least one computing device, and each computing device includes one or more processors and one or more memories. The processor of the at least one computing device is configured to run a control node, a to-be-migrated virtual machine, a new virtual machine, another virtual machine, a first virtual switch, a second virtual switch, and a router, to implement the data center in FIG. 2. The processor and the memory may be connected by using a bus.

The processor includes one or more general-purpose processors. The general-purpose processor may be any type of device that can process an electronic instruction, and includes a central processing unit (CPU), a microprocessor, a microcontroller, a main processor, a controller, an application-specific integrated circuit (ASIC), and the like. The processor performs various types of digital storage instructions, for example, software or firmware programs stored in the memory, so that the processor can enable the data center to provide various relatively wide services. For example, the processor can perform a program or process data, to perform at least a part of the method discussed in this specification.

The memory may include a volatile memory, for example, a random-access memory (RAM); or the memory may include a non-volatile memory, for example, a read-only memory (ROM), a flash memory, a hard disk drive (HDD), or a solid-state drive (SSD); or the memory may include a combination of the foregoing types of memories. The memory may store a service program configured to provide a service for the data center.

For example, FIG. 7 shows a processor on a computing device in the data center to run the control node, the to-be-migrated virtual machine, the new virtual machine, the another virtual machine, the first virtual switch, the second virtual switch, and the router. As shown in FIG. 7, the control node, the to-be-migrated virtual machine, and the router are separately run on different computing devices. The new virtual machine and the first virtual switch are run on one computing device, and the another virtual machine and the second virtual switch are run on another computing device. FIG. 7 is merely an example for description. The control node, the to-be-migrated virtual machine, the new virtual machine, the another virtual machine, the first virtual switch, the second virtual switch, and the router may be flexibly combined and deployed on any computing device.

Figure 8:
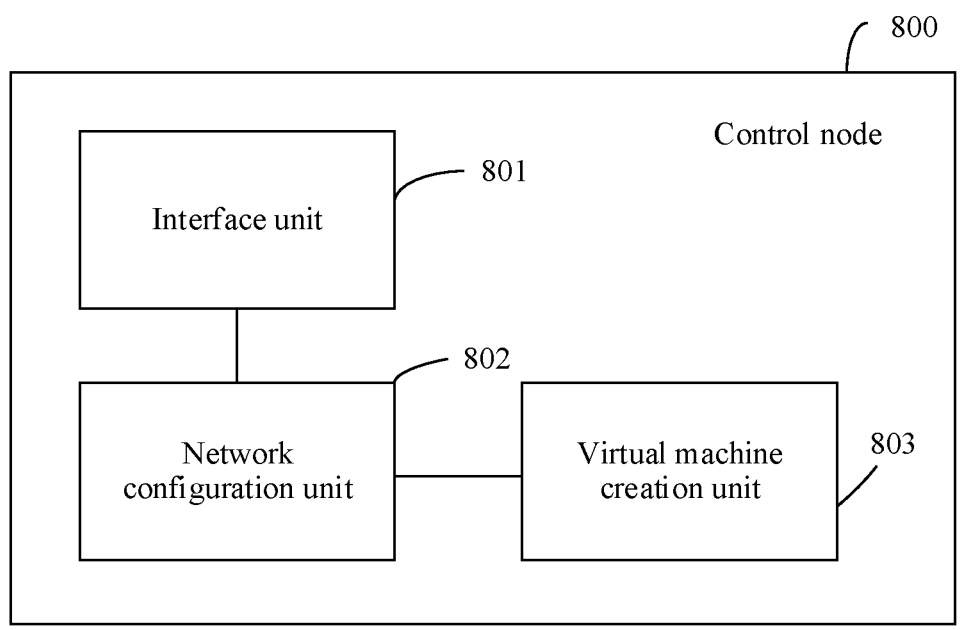
FIG. 8 is a schematic diagram of a control node according to an embodiment.

An embodiment further includes a control node 800, as shown in FIG. 8. The control node 800 includes an interface unit 801, a network configuration unit 802, and a virtual machine creation unit 803. The control node 800 is configured to implement the method in S301 to S305 or S501 to S517.

The interface unit 801 is configured to obtain a virtual machine migration message, where the virtual machine migration message includes location information of a first virtual switch, and the first virtual switch is configured to connect to a new virtual machine.

The network configuration unit 802 is configured to: perform first network configuration on the first virtual switch based on the location information that of the first virtual switch obtained by the interface unit 801, so that the first virtual switch forwards, to the new virtual machine, a packet sent by another virtual machine, where the another virtual machine has a communication connection to the to-be-migrated virtual machine; perform second network configuration on a second virtual switch, so that the second virtual switch forwards, to the another virtual machine based on the second network configuration, a packet sent by the new virtual machine, where the second virtual switch is connected to the another virtual machine; and perform third network configuration on a router, so that the router forwards, to the new virtual machine based on the third network configuration, a packet sent by a cross-subnet virtual machine, and forwards, to the cross-subnet virtual machine, a packet sent by the new virtual machine, where the router is deployed in a virtual network in which the to-be-migrated virtual machine is located, and the cross-subnet virtual machine and the to-be-migrated virtual machine are located in different subnets.

The virtual machine creation unit 803 is configured to create the new virtual machine after the network configuration unit 802 completes the first network configuration.

If the new virtual machine and the to-be-migrated virtual machine have a same internet protocol IP address, and the network configuration unit 802 is further configured to perform fourth network configuration on the second virtual switch, so that the another virtual machine does not forward the sent packet to the to-be-migrated virtual machine.

The control node 800 may be further configured to implement the methods in S401 to S406 or S601 to S621.

Specifically, the interface unit 801 is configured to obtain a virtual machine migration message, where the virtual machine migration message includes location information of a first virtual switch, and the first virtual switch is configured to connect to a new virtual machine.

The network configuration unit 802 is configured to: perform fifth network configuration on the first virtual switch based on the location information that of the first virtual switch obtained by the interface unit 801, so that the first virtual switch forwards, to the new virtual machine based on the fifth network configuration, a packet sent by another virtual machine, where the another virtual machine has a communication connection to the to-be-migrated virtual machine; perform sixth network configuration on a router, so that the router forwards, to a cross-subnet virtual machine based on the sixth network configuration, a packet sent by the new virtual machine, where the router is deployed in a virtual network in which the to-be-migrated virtual machine is located, and the cross-subnet virtual machine and the to-be-migrated virtual machine are located in different subnets; perform seventh network configuration on a second virtual switch, so that the second virtual switch forwards, to the another virtual machine based on the second network configuration, a packet sent by the new virtual machine, where the second virtual switch is connected to the another virtual machine; and perform eighth network configuration on the router, so that the router forwards, to the new virtual machine, a packet sent by the cross-subnet virtual machine.

The virtual machine creation unit 803 is configured to: create the new virtual machine after the network configuration unit 802 completes the fifth network configuration and the sixth network configuration.

If the new virtual machine and the to-be-migrated virtual machine have a same internet protocol IP address, and the network configuration unit 802 is further configured to perform fourth network configuration on the second virtual switch, so that the another virtual machine does not forward the sent packet to the to-be-migrated virtual machine.

Optionally, the network configuration unit may be a network control node of the data center, for example, a Neutron Server node of an OpenStack platform. The virtual machine creation unit may be a computing control node of the data center, for example, a Neutron Compute node on an OpenStack platform.

In another embodiment, the control node 800 may be a computing device shown in FIG. 7, and a control node is run on the computing device. In this case, the interface unit 801 may be a communications interface on the computing device, and the processor on the computing device performs the computer program instruction in the memory, to implement functions of the network configuration unit 802 and the virtual machine creation unit 803.

In the several embodiments provided, it should be understood that the disclosed apparatus and method may be implemented in other manners. The units described as separate parts may or may not be physically separate, and parts displayed as units may or may not be physical units, that is, may be located in one position, or may be distributed on a plurality of network units. Some or all of the units may be selected based on actual requirements to achieve the objectives of the solutions of the embodiments. In addition, function units in the embodiments may be integrated into one processing unit, or each of the units may exist alone physically, or two or more units are integrated into one unit.

What is claimed is:

1. A method for virtual machine migration and comprising:
   obtaining, by a control node, a virtual machine migration message comprising location information of a first virtual switch for connecting to a first virtual machine;
   performing, by the control node, a first network configuration on the first virtual switch based on the location information to enable the first virtual switch to forward a packet received from another virtual machine to the first virtual machine based on the first network configuration;
   creating, by the control node after performing the first network configuration, the first virtual machine to complete a same service as a second virtual machine; and
   performing, by the control node, a second network configuration on a second virtual switch for connecting to a third virtual machine.

2. The method of claim 1, further comprising forwarding, by the first virtual switch, to the first virtual machine, and based on the first network configuration, a first packet from the third virtual machine.

3. The method of claim 2, further comprising forwarding, by the second virtual switch, to the third virtual machine, and based on the second network configuration, a second packet from the first virtual machine.

4. The method of claim 3, further comprising performing, by the control node, a third network configuration on a router deployed in a virtual network comprising the second virtual machine.

5. The method of claim 4, further comprising forwarding, by the router, to the first virtual machine, and based on the third network configuration, a third packet from a cross-subnet virtual machine, wherein the cross-subnet virtual machine and the second virtual machine are located in different subnets.

6. The method of claim 5, further comprising forwarding, by the router to the cross-subnet virtual machine, the second packet.

7. The method of claim 1, wherein the first virtual machine and the second virtual machine have a same Internet Protocol (IP) address.

8. The method of claim 7, further comprising performing, by the control node, a fourth network configuration on the second virtual switch to enable the third virtual machine to not forward a packet to the second virtual machine.

9. The method of claim 1, further comprising deleting, by the control node, the second virtual machine.

10. A method for virtual machine migration and comprising:
    obtaining, by a control node, a virtual machine migration message comprising location information of a first virtual switch, wherein the first virtual switch is configured to connect to a first virtual machine;
    performing, by the control node, a first network configuration on the first virtual switch based on the location information;
    performing, by the control node, a second network configuration on a router deployed in a virtual network comprising a second virtual machine;
    creating, by the control node after performing the first network configuration and the second network configuration, the first virtual machine, wherein the first virtual machine is configured to complete a same service as the second virtual machine;
    forwarding, by the router, to a cross-subnet virtual machine, and based on the second network configuration, a first packet from the first virtual machine, wherein the cross-subnet virtual machine and the second virtual machine are located in different subnets;
    performing, by the control node, a third network configuration on a second virtual switch, wherein the second virtual switch is configured to connect to a third virtual machine; and
    performing, by the control node, a fourth network configuration on the router to enable the router to forward a second packet from the cross-subnet virtual machine to the first virtual machine.

11. The method of claim 10, further comprising:
    sending, by the first virtual switch, to the first virtual machine, and based on the first network configuration, a third packet from the third virtual machine; and
    sending, by the second virtual switch, to the third virtual machine, and based on the third network configuration, a fourth packet from the first virtual machine.

12. The method of claim 10, further comprising deleting, by the control node, the second virtual machine.

13. A data center comprising:
    a second virtual machine;
    a first virtual machine configured to complete a same service as the second virtual machine;
    a first virtual switch configured to:
      connect to the first virtual machine; and
      forward a packet received from another virtual machine to the first virtual machine based on a first network configuration;
    a third virtual machine configured to connect to the second virtual machine;
    a second virtual switch configured to connect to the third virtual machine; and
    a control node configured to:
      obtain a virtual machine migration message comprising location information of the first virtual switch;
      perform the first network configuration on the first virtual switch based on the location information;
      create, after performing the first network configuration, the first virtual machine; and
      perform a second network configuration on the second virtual switch.

14. The data center of claim 13, wherein the first virtual switch is configured to forward, to the first virtual machine based on the first network configuration, a first packet from the third virtual machine, and wherein the second virtual switch is configured to forward, to the third virtual machine based on the second network configuration, a second packet from the first virtual machine.

15. The data center of claim 13, further comprising:
    a router configured to deploy in a virtual network comprising the second virtual machine; and a cross-subnet virtual machine,
wherein the cross-subnet virtual machine and the second virtual machine are located in different subnets,
wherein the control node is further configured to perform a third network configuration on the router, and
wherein the router is configured to:
   forward, to the first virtual machine based on the third network configuration, a first packet from the cross-subnet virtual machine, and
   forward, to the cross-subnet virtual machine, a second packet from the first virtual machine.

16. The data center of claim 13, wherein the first virtual machine and the second virtual machine have a same Internet Protocol (IP) address, and wherein the control node is further configured to perform a fourth network configuration on the second virtual switch to enable the third virtual machine to not forward a packet to the second virtual machine.

17. The data center of claim 13, wherein the control node is further configured to delete the second virtual machine.

18. A data center comprising:
a first virtual switch;
a router;
a second virtual machine;
a third virtual machine;
a second virtual switch;
a cross-subnet virtual machine; and
a control node configured to:
   obtain a virtual machine migration message comprising location information of the first virtual switch;
   perform a first network configuration on the first virtual switch based on the location information;
   perform a second network configuration on the router;
   create, after performing the first network configuration and the second network configuration, a first virtual machine, wherein the first virtual machine is configured to complete a same service as the second virtual machine;
   perform a third network configuration on the second virtual switch; and
   perform a fourth network configuration on the router,
wherein the router is configured to:
   forward, to the cross-subnet virtual machine and based on the second network configuration, a first packet from the first virtual machine; and
   forward, to the first virtual machine and based on the fourth network configuration, a packet from the cross-subnet virtual machine.

19. The data center of claim 18, wherein the first virtual switch is configured to send, to the first virtual machine and based on the first network configuration, a third packet from the third virtual machine, and wherein the second virtual switch is configured to send, to the third virtual machine and based on the third network configuration, a fourth packet from the first virtual machine.

20. The data center of claim 18, wherein the control node is further configured to delete the second virtual machine.

* * * * *